United States Patent

Leenhouts

[11] 4,000,451
[45] Dec. 28, 1976

[54] MOTION CONTROL SYSTEM AND METHOD FOR LENGTH CODED SEQUENTIAL COMMANDS

[75] Inventor: Albert C. Leenhouts, Harwinton, Conn.

[73] Assignee: The Superior Electric Company, Bristol, Conn.

[22] Filed: Nov. 18, 1974

[21] Appl. No.: 524,965

[52] U.S. Cl. .............................. 318/571; 318/600; 318/603

[51] Int. Cl.² ......................................... G05B 19/28

[58] Field of Search .......... 318/571, 570, 569, 603, 318/600

[56] References Cited

UNITED STATES PATENTS

| | | | |
|---|---|---|---|
| 3,439,241 | 4/1969 | Martens | 318/571 X |
| 3,525,917 | 8/1970 | Leenhouts | 318/570 |
| 3,597,593 | 8/1971 | Stancsby | 318/569 X |
| 3,735,104 | 5/1973 | Holmgren | 318/517 UX |

*Primary Examiner*—B. Dobeck
*Attorney, Agent, or Firm*—Ernest M. Junkins

[57] ABSTRACT

A motion control system and method that subdivides a movement into commands for sequential lengths that the system is to produce in sequential constant time intervals with each time interval having a length. Each length has an extent in steps along each axis and the difference in the number of steps between adjacent extents is limited to that which the motor's ability can accommodate. Each command directs the selection of a present extent with the quantity of a command being reduced by commanding only the difference between the present extent and the immediately prior extent. For essentially constant velocity contouring along two axes an endless sequential series of essentially constant length vectors is provided and each command for a present vector directs the selection based on the relation between it and the prior selected vector. Selection may be made from a number of series of vectors each having a different size.

33 Claims, 11 Drawing Figures

| COUNT | PULSE RATE | PULSE LEAD |
|---|---|---|
| 15 | 7K | 23(+) |
| 14 | 6K | " |
| 13 | 5K | " |
| 12 | 4K | " |
| 11 | 3K | " |
| 10 | 2K | " |
| 9 | 1K | 23(+) |
| 8 | 0 | |
| 7 | 1K | 24(−) |
| 6 | 2K | " |
| 5 | 3K | " |
| 4 | 4K | " |
| 3 | 5K | " |
| 2 | 6K | " |
| 1 | 7K | 24(−) |

MOTION CONTROL SYSTEM AND METHOD FOR LENGTH CODED SEQUENTIAL COMMANDS

Most heretofore suggested numerical control systems have received commands for a movement and the commands are processed to effect control over the movement of motors. In such systems, the command for each movement is a direction from a present position to a desired position and the commands must be processed to effect motor movement so that the actual movement is along a path that closely corresponds to the commanded movement. Motors of the digital, stepping type which receive a pulse and essentially simultaneously produce an increment of movement or step have been used and the processing requires the determining of when, to which axis in a two or more axes system and how many pulses are to be supplied to each motor. One such system is shown in my U.S. Pat. No. 3,525,917 assigned to the assignee of the present invention.

Such systems, while satisfactory, are thereby rendered quite expensive by the need for a computer or the like for the pulse determination and accordingly their cost is generally somewhat high which basically limits the number of applications where such systems may be economically utilized. Moreover, in many instances in order to somewhat standardize numerical control systems, features are included which are not necessary for all applications thereby also increasing the cost which again would further limit the possible areas of economic applications.

It has also been suggested that these types of systems could be subdivided into a pulse determining portion and a pulse processing portion. The determining portion would produce the pulses required but would supply the pulses to a storage medium rather than directly to the motors or pulse processing portion. The stored pulses could then be used as commands whenever it is desired to control movement in a pulse processing portion which need be only a comparatively simple system. This eliminates the need for the somewhat expensive pulse determining portion to be directly connected to each pulse processing portion and hence one pulse determining portion may serve to prepare stored pulses for many pulse processing systems. However, each pulse processing system must be supplied with some form of pulse storage means such as tape, disc, magnetic core or semi-conductor memories, etc., and the cost and complexity of the storage of individual pulses has been a serious detriment to the economic utilization of this type of a divided system.

It is accordingly an object of the present invention to provide a motion control system and method which is rendered extremely simple and economical in construction by the use of consecutive commands, each of which directs only the length which the system is to produce in a constant time interval and with the total movement consisting of sequential lengths.

Another object of the present invention is to achieve the above object and reduce the information required to be stored for each command by having each command represent the number of pulses that are to be supplied to a motor means during its time interval or by representing the difference in the number of pulses between it and the prior command thereby substantially reducing the storage needed as compared to storing individual pulses.

A further object of the present invention is to provide a motion control system and method which provides a sequential series of different extents or number of pulses for each time interval and in which the command effects the selection of an extent based on its relationship to the immediately prior extent with the difference in extents being that which is within the finite ability of the system to change its velocity during the time interval.

Another object of the present invention is to provide a motion control system and method for effecting movement on two axes at an essentially constant velocity, in which the movement is selected as one vector in an endless sequential series of vectors having essentially the same size but each with a different direction and in which the command for each vector is sharply reduced by having it consist of directing the present vector to be only that which is prior to, next beyond or the same vector as the previously commanded vector in the series.

Still another object of the present invention is to achieve the immediately above-noted object and provide a system which has a plurality of different velocities, each with its own series of vectors having essentially the same size but each with a different direction, and in which the selecting of the desired velocity series is made by commanding the axes extents for a length that is the same as a vector in the desired series.

Another object of the present invention is to provide a numerical control system and method in which the code format has only a few strict requirements that must be followed thereby facilitating the preparation of the coded commands.

In carrying out the present invention the method and system utilizes the concept that a movement, whether on one, two or three or more axes, can be subdivided into a plurality of consecutive lengths. Each length is selected to be that portion of the movement which may be produced during a set time interval that is preferably constant for each length. Each length is defined as an extent along each axis and for the command to be effected into a length each axis must, in the same time interval, produce its extent over the duration of the time interval. The extent on each axis is the number of incremental steps that are to be taken in the time interval and a digital servo or stepping motor means is preferably used to produce the incremental steps by a step being produced essentially simultaneously with the receipt of a pulse by the motor means. The present system thus accepts the commands for a length and produces to each axis motor means, during the constant time interval, the number of pulses which the motor means is to translate into steps. The number of pulses and preferably also the steps, are substantially evenly spaced over the time interval.

While the exact number of pulses for each axis for each command could be coded as a number in storage means for each time interval, the present invention uses a command code which assigns a different code number to each pulse rate of plurality of pulse rates with the pulse rate selected being that which its code commands. Each pulse rate produces a set number of evenly spaced pulses during a time interval and thus a different extent. Though this would reduce the quantity of stored information in each command, the present invention even further reduces the command information by commanding the selection of a pulse rate in accordance with the difference between the immediately preceding pulse rate or extent and the present commanded pulse rate. For reasons that will hereinafter appear, the difference which is commanded in one embodiment of the invention is to select the pulse rate for the present command that is limited to only the next higher, the next lower or the same as the immediately preceding pulse rate or extent.

The system includes an up-down counter and each pulse rate is assigned a count so that the count of the counter selects the pulse rate. The zero rate, or no movement is assigned to the middle count, such as the 8 count in a 16 count counter and each increasing count has a progressively increasing (faster) pulse rate in one direction from the 8 count while each decreasing count from the 8 count also has a progressively increasing pulse rate, but in the opposite direction. The command for the extent along an axis is thus reduced to two bits by being a command which causes the counter count to either increase by one, decrease by one or remain the same for the present length as compared to the count used for the extent for the immediately prior length.

In a two axis system where it is desired to provide an essentially constant velocity, an endless series of sequential vectors is provided with each vector having a different combination of extents on the two axes but with the extents being limited to just those that produce during the time interval, the essentially constant velocity. The vectors are thus essentially the same size. The command for a vector is again reduced to only two bits by the command directing the selection of the present vector to only that which is just before, just after or the same as the immediately preceding vector in the series.

A plurality of different essentially constant velocities are provided, each of which has its own endless series of sequential vectors. A selection of the velocity desired is made simply and effectively by merely causing a length to have the extents along each axis that is identical to one vector which is in the velocity series desired. Thereafter, the selection of each vector can be commanded with the assurance that they will produce the desired velocity and motion.

Other features and advantages will hereinafter appear.

Figures 1, 2, 3, 4:
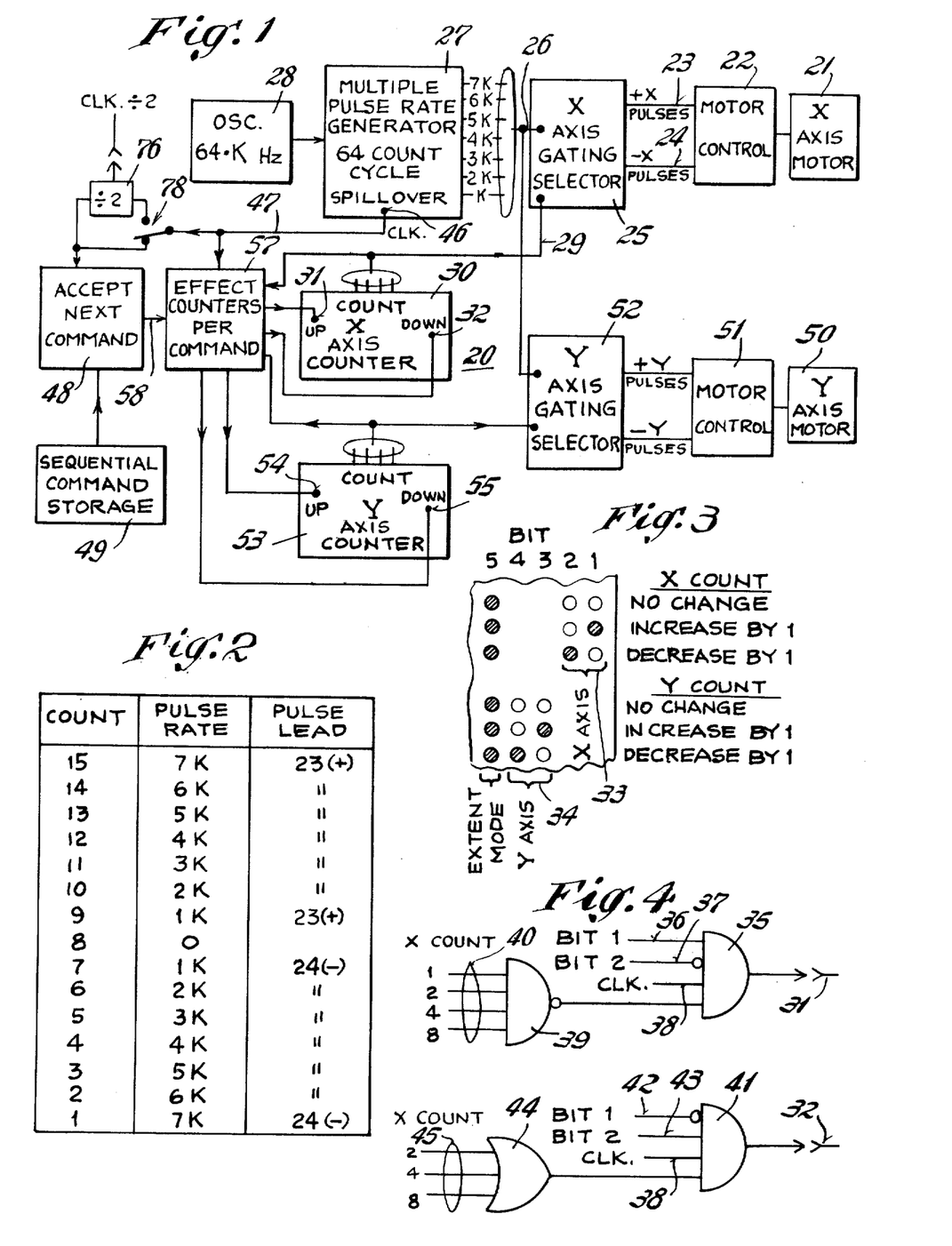
FIG. 1 is a block diagram of the motion control system of the present invention that utilizes the method herein disclosed.
FIG. 2 is a chart setting forth the relationship between the count of an axis counter, the pulse rate and the direction of movement.
FIG. 3 is a portion of punched tape showing the code format of the differential extent commands for each axis.
FIG. 4 is a circuit for decoding the commands given in the code format of FIG. 3 for one axis.

Referring to the drawing, the motion control system of the present invention is generally indicated by the reference numeral 20 and includes an X axis motor 21 and its motor control 22 with the motor control causing the motor 21 to be energized to move one step forward for each pulse received on a +X pulse line 23 and one step in a reverse direction for each pulse received on a −X pulse line 24. The pulse lines are connected to an X axis gating selector 25. A lead 26 is connected to a multiple pulse rate generator 27 which produces on a plural lead 26, seven different pulse rates denoted K, 2K, 3K, etc. to 7K so that the rate of pulses on the lead 7K is seven times the rate of the pulses on the lead K, the others being corresponding multiples.

The generator 27 is connected to an oscillator 28 which supplies the pulses to the generator, the latter serving to in effect divide the pulses so as to produce the different rates. The gating selector is further connected by a plural lead 29 to all of the count output terminals of an X axis counter 30.

The gating selector 25 consists of a plurality of gates that are utilized to direct just one of the pulse rates on the lead 26 to either the +X pulse lead 23 or the −X pulse lead 24 depending on the count of the counter 30. Shown in FIG. 2 is the relationship between the count of the X axis counter 30, the pulse rates and the motor means pulse lines 23 and 24 which the gating selector selects in accordance with the count. Thus, a counter count of 1 causes the pulse rate 7K to be connected to the −X line 24, a counter count of 2 causes the 6K rate to be connected to the −X pulse line 24, etc. As the counter count sequentially increases it incrementally decreases the pulse rate that is connected to the −X lead 24 with a count of 8 in the counter 30 producing no or zero pulses on either lead 23 or 24. For counter counts from 9 through 15, the rate of the pulses will incrementally increase from 1K through 7K and be connected to the +X axis line 23. Accordingly, the count of the counter causes the gating selector to produce on either lines 23 or 24, only one of the pulse rates from the multiple pulse rate generator 27.

The counter count may be set directly from coded commands being in binary code the count which the counter is to assume to produce for that command the pulse rate corresponding to the coded count. This would require for the 15 counts shown four binary bits for each axis for each command. However, the counter count may alternatively or additionally be incremented by 1 for each command by means of an up terminal 31 on which a signal can increase the counter count by 1 while each signal received on a down terminal 32 can decrease the counter's count by 1. By changing the count by 1 for each command, the pulse rate selected can thus only be changed from its present rate to an adjacent pulse rate, either higher or lower in accordance with the relationships set forth in FIG. 2. Thus, if the counter has a count of 10 producing a pulse rate of 2K, the produced pulse rate for the next command can only be the same pulse rate 2K, the K pulse rate (corresponding to the count of 9) or the pulse rate of 3K (corresponding to the count of 11).

Shown in FIG. 3 is a code which requires only two binary bits per axis to effect the limited selection of a pulse rate for a command by incrementing the counter count. The limiting of the selection of the counter count to being changed to just the three possibilities of no change, increase the count by 1 or decrease the count by 1 decreases the quantity of information that must be stored for each command and for reasons which will be hereinafter apparent, maintains operation of the system within the system's and especially the motor's ability while also simplifying the system.

As shown in FIG. 3, with a code having five bits indicated from 5 to 1, bits 1 and 2 control the X axis and are indicated by the reference numeral 33 with a binary 00 commanding a no change in the count from a prior count for the present length, a binary 01 commanding an increase of the X axis count by 1 to apply the next pulse rate to the motor means while a binary 10 commands a decrease of the X axis counter count by 1 from its immediately prior count.

Similarly, for the Y axis, binary bits 3 and 4 indicated by the reference numeral 34 are utilized with again a binary 00 producing command for no change in the Y axis count, of 01 increasing the Y axis counter by 1 and a binary 10 decreasing the count by one. It will be understood that while each axis is shown individually, that they may both be coded on one tape hole transverse line or character. Also if there are more than two axes, each additional axis would need its own two binary bits for its command.

The code format of FIG. 3 is quite simply and economically decoded into a command to increase the counter count by causing a signal to be applied to the up terminal 31 or to decrease the counter count by 1 by a signal being applied to the down terminal 32 or to provide a no-change by no signals being applied. Such a circuit for the X axis is shown in FIG. 4 and includes an AND gate 35 having inputs 36 and 37 connected to bits 1 and 2 and a clock pulse input 38 that is connected to receive a clock pulse at the beginning of each time interval. Another input of the gate 35 is the output from a NAND gate 39 which has its inputs 40 connected to the count terminals of the counter 30 so that a signal is produced except for a count of 15. The output of the AND gate 35 is connected to the up terminal 31. Another AND gate 41 has inputs 42 and 43 connected to the binary bits 1 and 2 and the clock pulse input 38. In addition, an OR gate 44 has its output connected as an input to the gate 41 while the input to the OR gate 44 is from the counter to produce an output for any count greater than 1 and is indicated by the reference numeral 45. The output from the AND gate 41 is connected to the down terminal 32.

With this decoding circuit, each time a clock pulse appears at the beginning of the time interval only the up terminal will receive a signal to increase its count if the corresponding code is read and only the down terminal 32 receives a pulse if its code is present as a command. For codes of binary 00 and 11, no change is made in the counter count as no signals are applied to the terminals 31 and 32. The NAND gate 39, serves to prevent incrementing the counter 15 beyond the count of 15 while the OR gate 44 prevents decreasing the counter count to less than 1 to thereby assure that even with improper instructions in the command, the counter count will always be in the range of 1 to 15 inclusive and will only change incrementally.

The selection of the values for pulse rates and the time interval are important aspects of the present invention. By their selection, the system is substantially simplified with resulting economies while maintaining the assurance that the pulses will be provided to the motor at a rate at which the motor can respond to each pulse to produce a step. The motor for each axis, either a stepping or digital servo, essentially simultaneously converts each pulse received by its motor control into a step.

The ability of the motor to change its velocity, i.e., accelerate or decelerate is limited, and any request by a varying of the pulse rate to change beyond its limit will prevent the motor from changing its velocity to correspond to the pulse rate, and hence each pulse will not produce a step. In the specific embodiment herein described, the motor is made to change its velocity at the same rate linearly over its speed range rather than varying its velocity change with its speed. As will be apparent, the system is capable of being altered so that non-linear velocity changes may be easily achieved.

With a linear velocity change ability of 25,600 steps/sec$^2$, based on the motor and the load moved thereby, the motor can start at the rate of 160 steps per second and with this pulse rate of 160, one pulse is produced in a time interval of 0.00625 seconds. For each successive time interval of the same duration, the motor can accelerate 1 step, so that for the first time interval, it can accelerate from a stopped condition to produce 2 step; for the second time interval, it can accelerate to produce 2 steps (1+1); for the third time interval, 3 steps (2+1), etc. For any time interval in which it is producing a number of steps, the next time interval can only have the same number, one less or one more steps. In this manner, the pulses which are converted into steps will never exceed a rate of change which would be beyond the motor's ability to produce the step. The code format of FIG. 3 by limiting the pulse rate to a change of no more than 1 pulse per interval, thus inherently assures that the commands for the motor's velocity change will always be within the motor's ability.

The change of 1 step per interval assures that at least with a stepping motor, the torque angle of the rotor will not increase more than 1 step per time interval and hence synchronism will not be lost. In other types of motors two or more steps per interval may be used without loss of synchronism but the deviation of the actual path from the commanded path could approach two or more steps rather than 1 step when the difference is one step or pulse.

The multiple pulse generator 27 produces on the leads pulse rates of K=160, 2K=320, 3K=480, etc., to 7K=1120 pulses per second which with a time interval of 0.00625 seconds, causes 1,2,3 etc. to 7 pulses to appear on one of the lines 23 or 24. This in turn causes the motor to correspondingly produce 1, 2, 3 etc., to 7 steps per time interval.

The generator may conveniently be a counter having a spillover count capacity of 64 and the oscillator 28 set to a rate of 64 times 160 or 10,240 H$_z$. A 1K rate is achieved by having the generator produce a pulse each time it has a 32 count, a 2K rate by producing a pulse for the 16 and 48 counts, a 3K for 10, 31 and 52 counts, etc. In some instances while there may not be an exactly constant count difference between pulses (for 3K the difference is 21, 21 and 22), the change in the difference is so minute, that the pulses can be considered to be produced at a constant rate. They are also spread evenly over the time interval. The generator 27 also has a terminal 46 entitled "spillover" and it produces a clock pulse (CLK) each time 64 pulses from the oscillator 28 have been counted.

The clock pulse initiates each time interval and as shown by a lead 47 may be connected to a block 48 entitled ACCEPT NEXT COMMAND which in turn is connected to a block 49 entitled SEQUENTIAL COMMAND STORAGE. The clock pulse terminal is also connected to the CLK marked inputs 38 of the AND gates shown in FIG. 4. With this structure, a clock pulse enables the change in the count of the X axis counter 30 to be changed to that commanded to the present command at the beginning of the time interval and also initiates the receiving of the next command during the time interval. The next command, however, cannot change the counter's count until the next clock pulse appears.

While reference has been made to the X axis, the circuit has a Y axis motor 50, motor control 51, gating selector 52 and counter 53 with an up terminal 54 and a down terminal 55. They are identical to and function in the same manner as their X axis corresponding components. A circuit such as shown in FIG. 4 is also provided but connected to bits 3 and 4.

The present system and method enables an even further reduction in the information that is required to be stored for each command for that portion of a movement which is desired to be at an essentially constant velocity. Considering a two axes planar system, with each motor 21 and 50 being connected to move a part along its axis an equal length linear step for each pulse, the number of steps or extents for each length must have a value in which their resultant essentially equals the desired velocity. If, for example, each motor step produces a linear 0.001 inch step, extents of X=6, Y=0; 6,1, 6,2; 5,3; 4,4; 35 etc. will produce resultant lengths of about 6 steps or a speed of 0.006 inch per time interval or about 1 inch per second for time interval of 0.00625 seconds.

Figure 5:
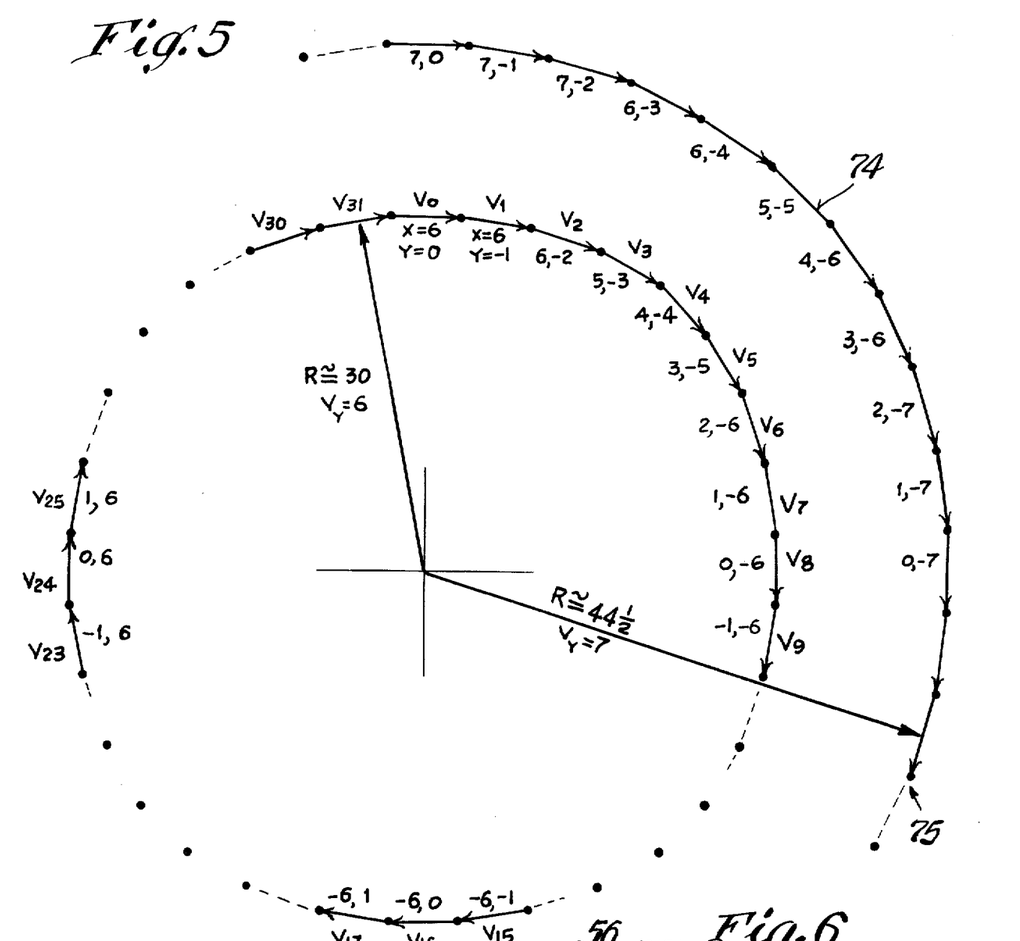
FIG. 5 is a diagrammatic representation of an endless sequential series of vectors having extents along two axes which produce an essential constant velocity of six steps per vector and a portion of a series of vectors that produce an essentially constant velocity of seven steps per vector.

Shown in FIG. 5 is a plurality of resultant lengths which may be termed vectors as each length has both distance and direction and which may be used if it is desired to have a velocity of about 6 steps for a time interval. Though the distances vary between 5.66 and 6.32 steps to cause a variation in velocity its value is low enough so as to be generally quite tolerable. A first vector is indicated by the reference character V0, the next by V1, etc., to a vector V9, then vectors V15–V17, V23–V25 and V30 and V31. The vectors in the gaps are merely numerical duplicates but with changed signs or axis of the vectors V1–V9.

Each vector is shown by its size and direction and it will be noted that the vectors are portrayed by the connection of the end of one vector to the beginning of the next so that they essentially form a circle. This particular manner of portraying the vectors is to show that they form an endless series of sequential vectors. The vectors, if sequentially commanded would produce essentially a circle having a radius of about 30 steps as indicated by R-30.

The selection of the extents forming each vector and their position in the series causes the immediately previous adjacent vector or the immediately next beyond adjacent vector to have a change in extent along an axis that is not greater than one. Accordingly, if vectors are commanded which are limited to either the prior, the same or the next in the series from a present vector, it is assured that neither axis will receive a change in its pulse rate that is greater than the selection of the same count, a 1 count higher or a 1 count lower.

Figures 6, 7:
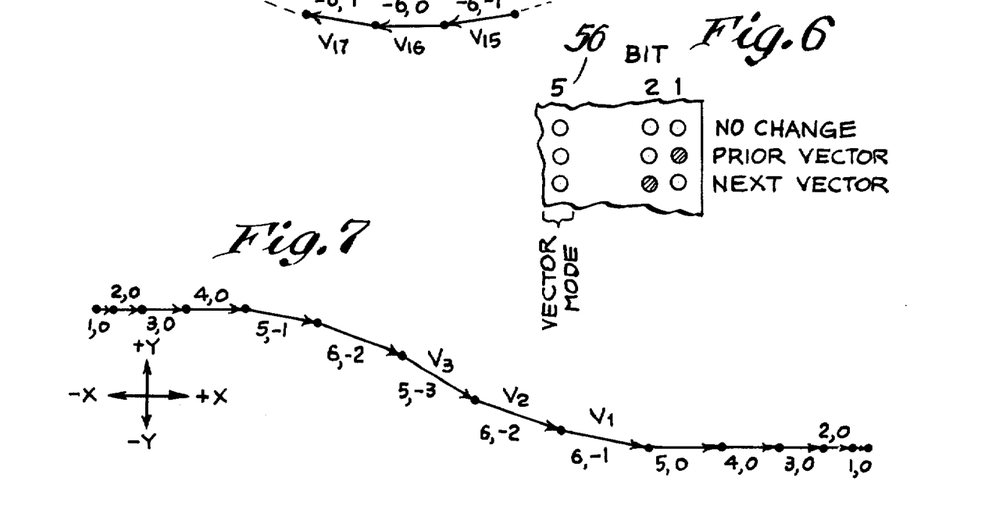
FIG. 6 is a portion of punched tape having the mode format for the differential vector commands in one series of vectors.
FIG. 7 is an exemplary movement that is subdivided into lengths that occur during constant time intervals with each length having the numerical extent indicated.

The determination of the series enables the quantity of information required to be stored for a command to be even further reduced from that commanding each axis individually. Thus, as shown in FIG. 6 a code format may be used which uses bits 1, 2 and 5 to supply commands for the selection of a vector for each time interval. A binary 00 in bits 1 and 2 is a command to repeat the same vector, a binary 01 is a command to select the immediately prior vector while a binary 10 is a command to select the next vector in the endless series. To effect selection in the system, the fifth bit indicated by the reference numeral 56 is a binary 0 when vector commands are made and a binary 1 (FIG. 3) when axis extents are commanded.

Figure 8:
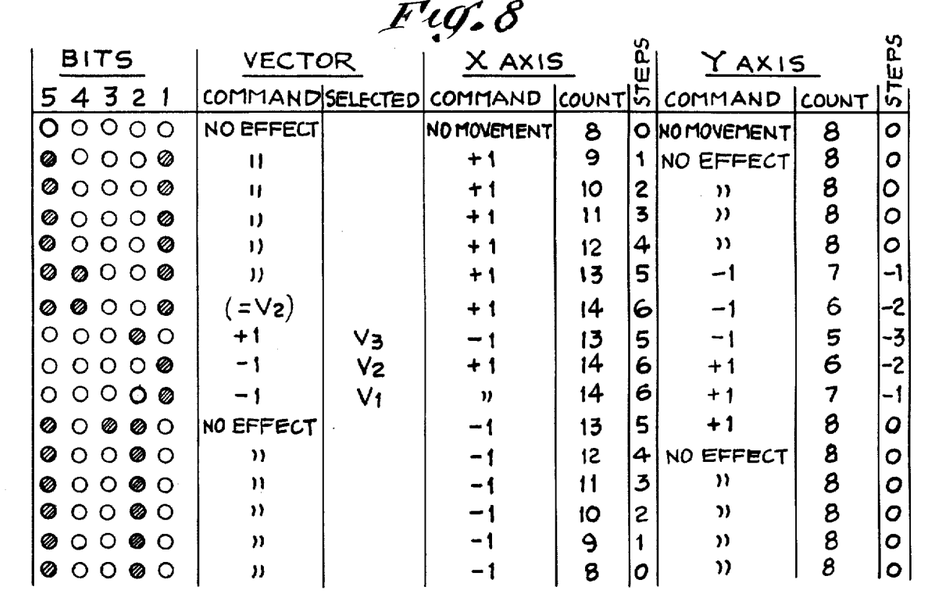
FIG. 8 is a chart of the commands for producing the movement of FIG. 7 together with indications of the corresponding counter counts and pulses (or steps) for each axis.

An example of a movement which the present system may produce is shown in FIG. 7 while the commands and the effect of the commands are shown in FIG. 8. The movement is desired to have a constant velocity of about 6 steps per vector ($V_Y = 6$) with the first such vector being X=6, Y=2. To achieve this velocity, the initial lengths are axis extent commands with the X axis extent being increased by each command while the Y axis extents are initially maintained at zero and increased by 1 only in the fifth and sixth commands. At the sixth command, the length commanded corresponds to the extents or counts for one of the vectors in the $V_Y = 6$ series, namely V2, and the system may then shift to the vector code format of FIG. 6. The binary 5 bit had previously been a binary 1 for axis extent commands and after the sixth command, a binary 0 is used for vector commands.

The next three commands are vector commands with the seventh command effecting the selection of the vector V3, which is the vector that is next beyond the V2 vector. The next (eighth) command requires the selection of the vector prior to vector V3, hence the vector V2, while the ninth length command requires the selection of vector V1, the vector that is prior to the V2 vector in the series.

The vector V1 has values of X=6 and Y=1, and the last part of the movement uses axis extent length commands to decrease the rate on the X axis to zero in 6 commands and the Y axis to zero in one command. The movement is complete when both motors no longer receive pulses.

Figure 9:
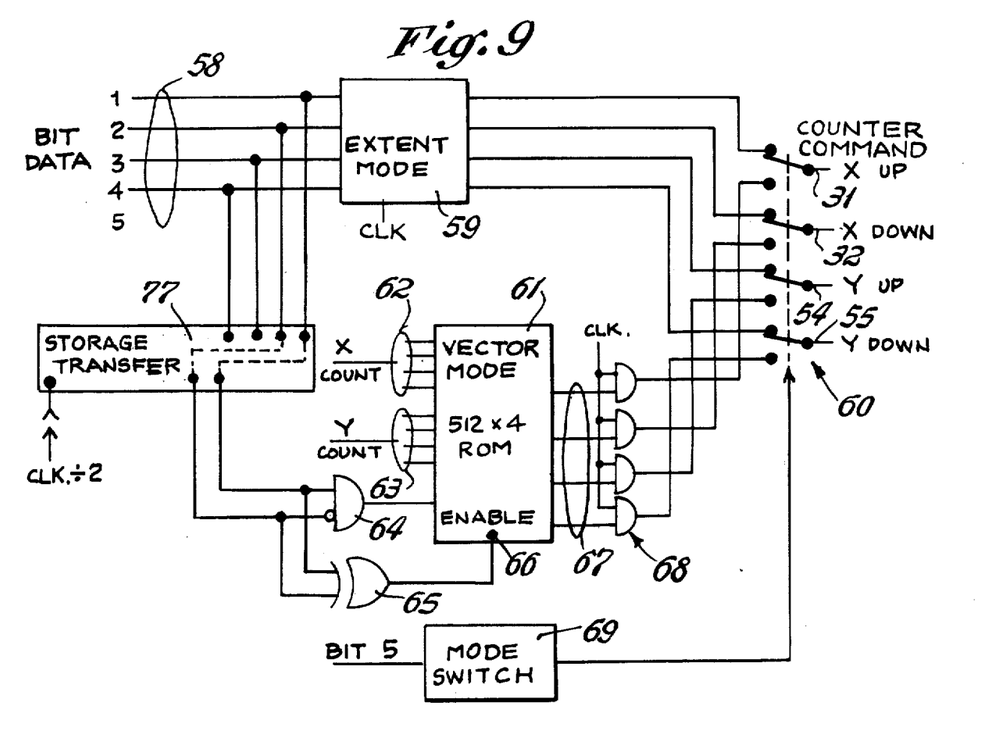
FIG. 9 is a block diagram of portions of the "effect counters per command" block of FIG. 1 for decoding the coded commands into counter count change commands.

A circuit for changing the counter counts in accordance with the vector code format is shown in FIG. 9 and is the circuit that is represented by the "effect counters per command" block 57 of FIG. 1. The bit data is supplied on a plural line 58 to an axis extent mode block 59 which in turn through switches 60 is connected to the four counter terminals 31, 32, 54 and 55. The block 59 includes two circuits having the structure shown in FIG. 4, one for each axis. The system further includes a programmed read only memory 61 which has four inputs 62 connected (lead 29) to the count terminals of the X axis counter and four inputs 63 connected to the Y axis count terminals. In addition, bits 1 and 2 are shown connected to an AND gate 64 whose output constitutes another (or ninth) input to the ROM 61. An exclusive OR gate 65 has its output connected to the terminal 66 of the ROM 61 while its inputs are connected to bits 1 and 2.

The output of the ROM 61 appears on four leads 67 which in turn are connectible by operation of the switch 60 to the four counter terminals. AND gates 68 may be interposed between the output of the ROM and the switches to assure that transference of the information will be synchronized with the clock pulses.

Switch 60 is operated in accordance with the command in bit 5 by a block 69 which maintains the switches 60 in their solid line position shown wherein the axis extent mode output (block 59) for a bit 5 binary 1 is connected to the count terminals while a bit 5 binary 0 causes the switches to shift for connection to the output leads 67.

The memory 59 is programmed so that with the extents of one vector appearing as counter counts on leads 62 and 63 and a direction binary bit appears from the gate 64, the ROM will produce an output on the leads 67 which are the necessary commands to the counters to increase or decrease their count to effect the extent for the commanded vector. For example, if the vector V3 is present, and the command for the next vector is to select the next vector (V4) in the series, the ROM has an input of 1101,0101 (for counts 13 and 5) and 1. The ROM is programmed to produce, with this input condition, a signal to the X counter down terminal and a signal to the Y counter down terminal. If the command had been to select the prior vector (V2), the ROM input would be 1101, 0101 and 0, and with this input condition, it is programmed to produce a signal to the up terminal of each counter to cause vector V2 to be selected. As each vector thus has a different count combination, each vector will provide a different input to the ROM which enables it to be programmed to produce the commands to the counters.

One memory which may be employed is a Texas Instrument type SN74S270 which has 512 possible input conditions and four outputs. The gate 66 serves as a control input to the memory to enable it to produce an output only when there is to be a change in the present vector from the prior commanded vector.

Figures 10, 11:
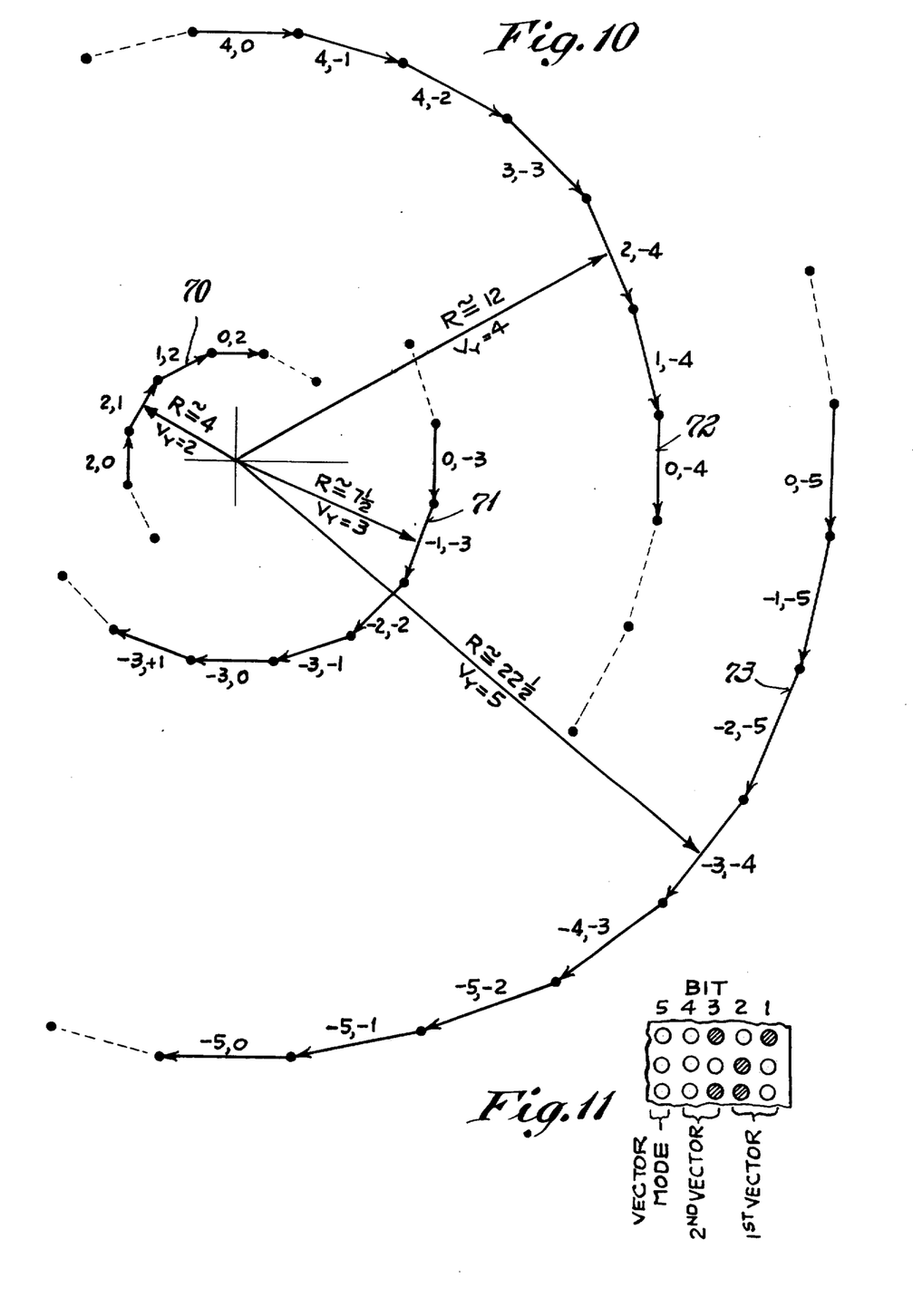
FIG. 10 is a diagram of a plurality of endless series of vectors having different velocities.
FIG. 11 is a portion of a punched tape in which two vector commands are coded on each transverse hole line.

While reference has heretofore been made to a series of constant velocity vectors of 6 steps per time interval, reference is made to FIG. 10 and also to FIG. 5 in which portions of other endless series of vectors having different velocities is disclosed. In FIG. 10, reference numeral 70 indicates a portion of an endless series where the vectors have a distance of about two steps per interval and the series would have a radius of about 4 steps; reference numeral 71 indicates a portion of an endless series of vectors having a distance of 3 steps and a radius of about 8; reference numeral 72 an endless series of vectors having a distance of 4 steps and a radius of approximately 12 steps and reference numeral 73 a portion of an endless series of vectors having a distance of about 5 steps and a radius of about 22-½ steps. In FIG. 5, a portion 74 of an endless series 75 of vectors for a distance of 7 steps per interval is shown and this series would have a radius of about 44½ steps.

It will be noted that even with six endless series not one of the vectors is repeated, i.e., has the same extents along the axes as any other vector. Thus, there is a different input to the ROM 61 for each vector which enables it to be programmed for all six series. To select a series, the system requires that the axis extent mode be used to produce a vector which is in the series desired. Similarly, to change from one series to another, the axis extent mode is used, to cause a vector of the new series to be produced and thereafter vector commands may be used for the new series.

Each of the endless series of vectors when interconnected in the manner shown essentially defines a circle and the value of the radius or R indicated for each is the minimum radius arc which the system may produce for the constant velocity chosen. The limitation is caused by the motor's inability to change their velocity within the time interval. However, by shifting from one series to the next or by using axis extent mode commands, smaller curve type movements may be produced at a lesser velocity.

The vector code format of FIG. 6 only utilizes bits 1, 2 and 5 and the present invention even further enables the reduction of the storage of the commands by utilizing bits 3 and 4 as additional vector commands. Thus, as shown in FIG. 11, a code format whereby bits 1 and 2 command a first vector and bits 3 and 4 command the next vector may be used to almost double the command storage in each tape character or line. The system may be easily adopted to the code of FIG. 11 by the inclusion of a divide by two switch 76 (FIG. 1) which only permits every other clock pulse to be directed to the accept next command block 48 and the inclusion of a storage and transfer block 77 (FIG. 9) to which alternate clock divide by two pulses are applied from the divide by two switch 76. A switch 78 is schematically shown as enabling the shifting from the code format of FIG. 6 to the code format in FIG. 11, though it will be understood that circuitry may be employed for sensing if there are commands in bits 3 and 4 and then automatically operating switch 78.

For ease of explanation, reference has been made to punched tape as the storage means of the commands. Other forms of storage means which may be preferable would include memories such as disc, core, semi-conductor programmed, magnetic type, etc. Further, the command storage may be compressed especially when a plurality of identical successive commands appear. Further, the bits may be individually sequentially arranged as in a disc memory.

While a time interval with a duration of 0.00625 seconds has been specifically referred to, the duration may be easily altered by changing the rate of the oscillator 28. Thus, for a duration of 0.00833 seconds (1/120), the oscillator would be set to produce pulses at a rate of 64 × 120 or 7680 $H_z$. Such convenient adjustability enables the system to be easily changed from one value of velocity change to another to thereby render the system quite adaptable to many different motors and/or applications.

While the prior description of the invention relates to producing movements, it will be clear that by using more bits miscellaneous control functions may be commanded, as for example tool up, tool down, etc.

The producing of the program may be effected in many ways. One obvious manner is to calculate each length required to produce a path that is within a desired tolerance of the movement. Another manner would involve determining the axis on which successive steps must be individually taken to produce the movement and then combining the steps into axis extents and length difference commands.

The low data rate and the low operating rate of the system permits the system to be made quite noise immune. Slow speed circuitry which may include discrete components may accordingly be employed, thereby increasing the operational reliability of the system. This is also aided by the low number of components which the system requires. The gating selector 25 may be an intergrated circuit of the type available from Texas Instrument No. SN74LS 157.

Though it is preferred that the commands be determined and then stored for use, the system could just as well operate from commands that are determined or calculated during the movement.

With respect to a non-linear velocity change, the rates of the pulses from the generator 27 may be altered as, for example, 1K, 3K, 5K, 7K, 8K, 9K, etc., to achieve a faster intermediate speed change in velocity. Also while seven rates have been shown more or less may be made available if desired.

It will accordingly be understood that there has been disclosed an extremely simple and reliable numerical control system and method. The system depends upon receiving a command for a movement in which the command uses a code to set the number of steps (or pulses) which the system is to produce evenly in a time interval for that command. The quantity of information required to be stored for each command is further reduced and an assurance that a command will not exceed the system's ability is obtained by limiting the difference between adjacent commands to the system's ability and only commanding through the code the difference. Further minimization of stored information per command is achieved with the obtaining of an essentially constant velocity by providing an endless sequential series of vectors of about the same size and commanding only the difference in position in the series between a present vector and the subsequent vector.

Variations and modifications may be made within the scope of the claims and portions of the improvements may be used without others.

I claim:

1. A motion control system for producing a movement normally having a plurality of steps along an axis comprising motor means for producing a step for each pulse received, means for providing pulses at a plurality of different rates, means for identifying each rate by a code representation unique to each rate, means for accepting a command in a code related to the representation for one of the rates, means for supplying pulses at the rate corresponding to the commanded representation and means for terminating the pulses at the rate commanded by the first command with the receipt of the next command, in which there is a difference between the representations for each rate and in which the relation in the command is the difference between the representation of the rate for a prior command and the representation of the rate dictated by a present command and in which the means for supplying pulses immediately begins supplying pulses at the rate commanded by the next command upon the receipt thereof.

2. The invention as defined in claim 1 in which at least for movement in one direction on the axis, the representations are sequentially increasing numerical representations, in which the pulse rates are arranged according to their rates and in which each higher pulse rate is represented by a higher numerical representation than the next lower pulse rate and its numerical representation.

3. The invention as defined in claim 1 in which at least for movement in a direction on an axis, the representations are sequentially increasing numerical representations, in which the pulse rates are arranged according to their rates, and in which each lesser pulse rate is represented by a higher numerical representation than the next higher pulse rate and its numerical representation.

4. The invention as defined in claim 1 in which the means for identifying includes count means having a plurality of sequential counts and in which the code representation for each pulse rate is a unique count of the count means.

5. The invention as defined in claim 4 in which the counts of the count means increase sequentially and in which sequentially increasing counts are assigned to progressively increasing pulse rates for movement in one direction and progressively decreasing pulse rates for movement in the other direction.

6. The invention as defined in claim 4 in which the means for accepting the code representation of the command alters the count of the count means to that of the numerical representation of the count for the commanded rate.

7. The invention as defined in claim 4 in which the code representation for the next command corresponds to the numerical difference between the count for the present command and the count for the commanded rate for the next command.

8. The invention as defined in claim 4 in which the system has the next command limited to a choice of either increasing the count by one, decreasing the count by one or maintaining the same count.

9. The invention as defined in claim 1 in which the system produces a movement normally having a plurality of steps on a second axis simultaneously with movement on the one axis, second motor means for producing a step for each pulse received, second means for accepting a second command in a code related to the representation for one of the rates and second means for supplying pulses to the second motor means at the rate corresponding to the second commanded representation with the pulses supplied by the second means occurring over the same time interval as the pulses supplied to the first mentioned motor means.

10. The invention as defined in claim 9 in which there are means for sequentially storing a plurality of commands, each command for movement on one axis being stored with the commands for the movement on the another axis that is to occur simultaneously therewith, means for rendering the commands for both axes acceptable to the system and means for accepting each command upon the termination of the pulses commanded by the prior commands for both axes.

11. The invention as defined in claim 1 in which the means for terminating includes means for setting a time interval and in which the time interval is constant for each command.

12. The invention as defined in claim 11 in which each of the pulse rates is selected to supply a whole number of pulses during the constant time interval.

13. The invention as defined in claim 12 in which the pulse rates are arranged in an order of increasing rates, the whole number of pulses for one rate differs by one pulse per command from the whole number of pulses produced by its adjacent pulse rates.

14. A motion control system for producing simultaneous movement of an extent on each of two axes with the values of the extents in increments producing a length having essentially a desired distance comprising motor means for each axis with each motor means producing an increment of movement for each pulse received, means for recognizing representations of an endless series of sequential different lengths with each length being defined by an extent in increments on each axis with the lengths being essentially of a constant desired distance, means for accepting a command of a length and producing its extents as pulses to the motor means and means for accepting a command for the next length upon the termination of supplying pulses for the first mentioned length.

15. The invention as defined in claim 14 in which means for accepting a command accepts the command for the next length as being the difference in position in the endless series of lengths from the position of the first mentioned length.

16. The invention as defined in claim 15 in which means for accepting have the positions in the series limited to the same length, the immediately before length and the immediate succeeding length.

17. The invention as defined in claim 14 in which the means for recognizing recognizes a plurality of endless series of different lengths with each series of lengths having its own essentially constant distance that is different from the constant distances of the other series.

18. The invention as defined in claim 17 in which the means for recognizing the lengths includes having each length have its own unique representation that is different from any other length.

19. The invention as defined in claim 14 in which the system includes means for accepting commands dictating extents that are to produce on each axis and in which there are means for distinguishing between a command for a length and a command for axes extents.

20. The invention as defined in claim 19 in which the means for accepting accepts a command for a length only if it follows a command that produces axes extents that are identical to the extents of a length recognized by the recognizing means.

21. The invention as defined in claim 20 in which the means for recognizing selects the endless series to which the length commands are to apply by selecting the series in which the length is positioned.

22. The invention as defined in claim 14 in which the system includes means for storing a command for at least a subsequent length while accepting a command for an immediately prior length.

23. A motion control system for accepting a command for movement along an axis with the command containing two bits, means for providing movement at different speeds along the axis and means for accepting one code of the two bits and providing movement at the same speed as that caused by a prior command, of a second code of the two bits and providing movement at the next lower speed than the speed caused by the prior command and of a third code of the two bits and providing movement at the next higher speed from the speed caused by the prior command.

24. A method for commanding and producing movement in which the movement is subdivided into a plurality of consecutive lengths with each length consisting of a whole number of increments comprising the steps of providing a command for each length, producing for a present command the dictated number of increments in its length, coding the next command for the difference in the number of increments desired between the next length and the present length with the difference being limited to no more than one increment and producing the number of increments in the next length dictated by the next command.

25. The invention as defined in claim 24, in which there is the step of providing a plurality of rates with each providing a different number of increments for each length and arranging the rates in a selected order with adjacent rates differing by one increment for each length, in which the step of producing the present length selects one of the rates and in which the step of coding the next command codes the difference in position in the order for the rate for the next length as compared to the position in the order for the rate for the present length.

26. A method for commanding and producing movement in which the movement is subdivided into a plurality of consecutive lengths with each length consisting of a number of increments comprising the steps of providing a plurality of different rates each providing a different number of increments for each length, arranging the rates in a selected order, producing increments in a present length at one rate in accordance with a present command, coding the next command for the difference in position in the selected order of the rate for a next length as compared to the rate for the present length and producing increments at the next commanded rate for the next length.

27. The invention as defined in claim 26 in which the steps of arranging arranges the rates in accordance with their speed.

28. The invention as defined in claim 27 in which the step of coding limits the difference to no more than the immediately preceding, the same as or the next beyond rate for the next length as compared to the rate for the present length.

29. The invention as defined in claim 26 in which the step of producing the increments for a length has the same time interval for each length.

30. A method for commanding and producing movement along two axes in which the movement is subdivided into a plurality of consecutive essentially equidistant lengths with each length having an extent in increments along each axis and in which the increments on the axis are produced simultaneously, and with there being one command for each length comprising the steps of providing a plurality of different lengths, arranging the lengths in an endless sequential series, selecting a present length to be produced by a present command, coding the next length in accordance with its relative position in the series from the position of the present length and producing the motion dictated by the next length.

31. The invention as defined in claim 30 in which the step of coding limits the position of the next length to that which is either immediately preceding, the same as or the next beyond the present length in the series.

32. The invention as defined in claim 30 in which the step of providing selects each length to have an extent on each axis which is no more than a constant number of increments from its adjacent lengths.

33. The invention as defined in claim 32 in which the constant number is one.

* * * * *